United States Patent
Hanevich et al.

(10) Patent No.: US 6,792,295 B1
(45) Date of Patent: Sep. 14, 2004

(54) WIRELESS DEVICE FOR USE WITH A VEHICLE EMBEDDED PHONE

(75) Inventors: Daniel A. Hanevich, Troy, MI (US); Timothy R. Nixon, Northville, MI (US); Walter A. Dorfstatter, Farmington Hills, MI (US); Mark J. Timm, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/481,859

(22) Filed: Jan. 12, 2000

(51) Int. Cl.[7] .................................................. H04B 1/38
(52) U.S. Cl. ................................ 455/569.1; 455/575.1; 455/557; 340/425.5
(58) Field of Search .............................. 455/557, 575, 455/569, 575.1, 569.1; 340/425.5

(56) References Cited

U.S. PATENT DOCUMENTS 6,032,054 A * 2/2000 Schwinke .................... 455/557
6,429,773 B1 * 8/2002 Schuyler .................. 340/425.5
6,532,374 B1 * 3/2003 Chennakeshu et al. .... 455/569.1

OTHER PUBLICATIONS

"Motorola—What you never thought possible"—GM Technology Days, Warren Tech. Center—Mid/Lux Building, 6 pages.
"The April 1986 Handbook for the Radio Amateur" by the American Radio Relay League, Newington, CT 06111. Library of Congress 41–3345 63rd edition, ISBN 0–87259–063–1, Special Spectrum Communication, pp. 21–7 to 21–17.

* cited by examiner

Primary Examiner—Nay Maung
Assistant Examiner—Alan T. Gantt
(74) Attorney, Agent, or Firm—Anthony Luke Simon

(57) ABSTRACT

An exemplary embodiment of the invention is a communications system including a vehicle embedded cellular phone subsystem for receiving and sending communications and a wireless device subsystem including a base station and a wireless device. The base station is coupled to the vehicle embedded cellular phone subsystem for receiving incoming cellular communications at the wireless device and sending communications from the wireless device to the vehicle embedded cellular phone subsystem.

7 Claims, 2 Drawing Sheets

WIRELESS DEVICE FOR USE WITH A VEHICLE EMBEDDED PHONE

TECHNICAL FIELD

The present invention relates generally to a wireless device for use with a vehicle embedded phone.

BACKGROUND OF THE INVENTION

Existing vehicle embedded cellular phones are useful for receiving incoming calls and making outgoing calls when a user is operating a vehicle. These vehicle embedded cellular phones may include a hands free audio processor which allows the user to receive incoming calls, make outgoing calls and perform a variety of other functions without requiring manipulation of a handset. Unfortunately, users often carry a portable cellular phone in order to receive incoming calls and make outgoing calls when the user is away from the vehicle. This results in the user paying the expense for both the vehicle embedded cellular phone and the portable cellular phone. Accordingly, there is a need for an improved vehicle communications system.

SUMMARY OF THE INVENTION

An exemplary embodiment of the invention is a communications system including a vehicle embedded cellular phone subsystem for receiving and sending communications and a wireless device subsystem including a base station and a wireless handset. The base station is coupled to the vehicle embedded cellular phone subsystem for receiving incoming cellular communications at the wireless handset and sending communications from the wireless handset to the vehicle embedded cellular phone subsystem.

BRIEF DESCRIPTION OF THE DRAWINGS

The present invention will now be described, by way of example only, with reference to the accompanying drawings in which.

DESCRIPTION OF AN EMBODIMENT OF THE INVENTION

Figure 1:
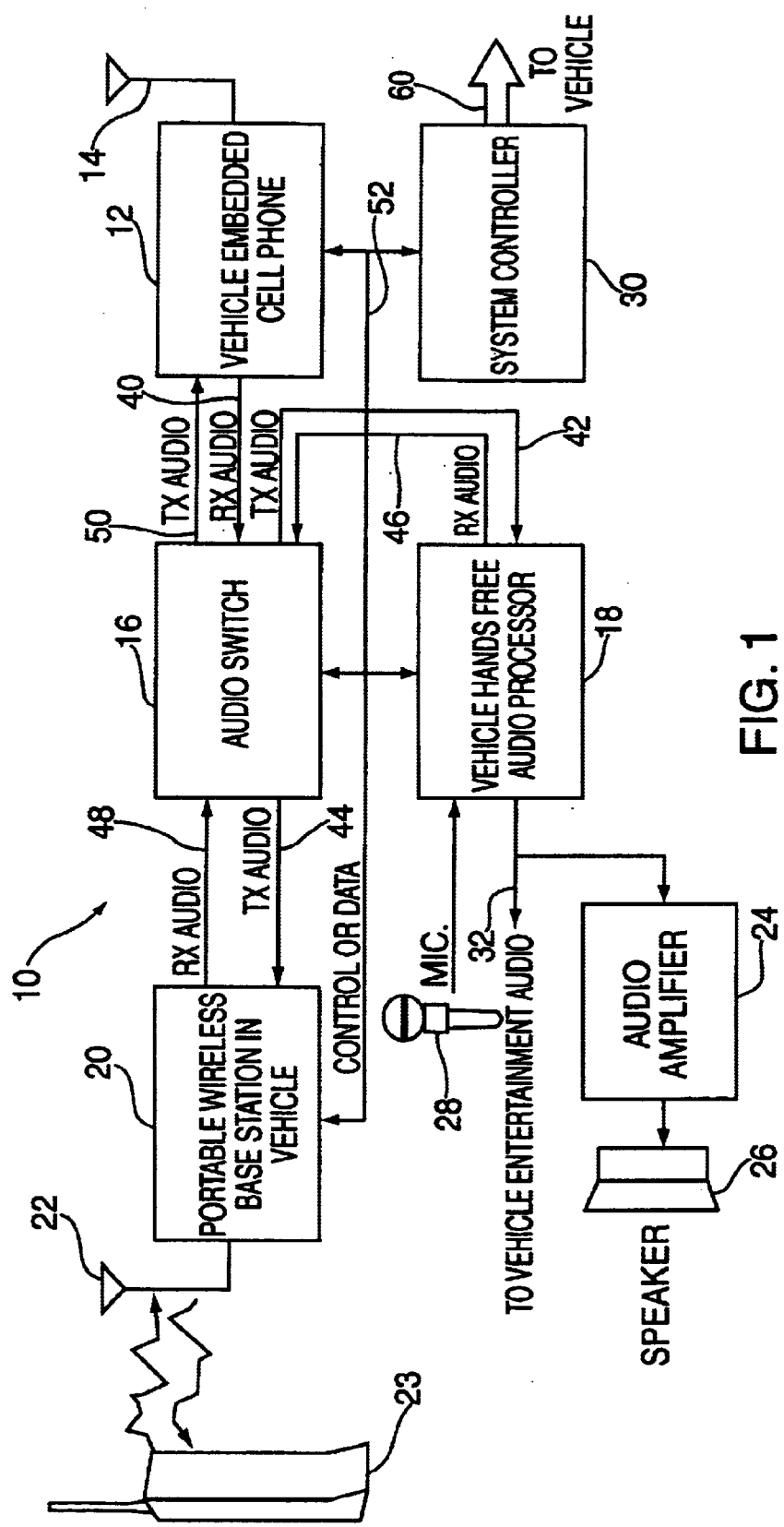
FIG. 1 is a block diagram of a vehicle communications system in an exemplary embodiment of the invention.

FIG. 1 is a block diagram of a communications system shown generally as 10 in an exemplary embodiment of the invention. The communications system includes a vehicle embedded cellular phone subsystem 12 and associated antenna 14 for receiving incoming calls and sending outgoing calls from and to a cellular station as is known in the art. An audio switch 16 couples a wireless device subsystem and a vehicle hands free subsystem to each other and to the vehicle embedded cell phone subsystem 12. The wireless device subsystem includes a base station 20, an antenna 22 and a portable, wireless handset 23. In an exemplary embodiment, the handset 23 and base station 20 communicate using a 900 MHz, spread spectrum technique or other short range secure wireless technology. The vehicle hands free subsystem includes a vehicle hands free audio processor 18, a microphone 28, an audio amplifier 24 and a speaker 26. As is known in the art, audio output is provided to the user through audio amplifier 24 and speaker 26. The vehicle hands free audio processor 18 receives communications and commands from the user through microphone 28. The vehicle hands free audio processor 18 may also provide audio to the vehicle entertainment audio subsystem (e.g., stereo system speakers) via output 32. A system controller 30 controls routing of communications through the system as described in detail herein.

An incoming communications signal is received at the vehicle embedded cell phone subsystem and provided to the audio switch 16 by signal path 40. From the audio switch, the incoming audio signal may be provided to vehicle hands free audio processor 18 by signal path 42 or to base station 20 by signal path 44. A signal from the vehicle hands free audio processor 18 is provided to the audio switch 16 by signal path 46. A signal from phone base station 20 is provided to the audio switch 16 by signal path 48. A signal from audio switch 16 is provided back to the vehicle embedded cellular phone subsystem 12 by signal path 50. The system controller 30 sends and receives commands and data to and from the base station 20, the audio switch 16, the vehicle hands free audio processor 18 and the vehicle embedded cellular phone subsystem 12 over signal path 52.

The communications system 10 may be used in a number of ways. The handset 23 may be used within the vehicle or outside the vehicle. When the handset 23 is located within the vehicle it may serve as a handset for either driver or passengers for the vehicle embedded cellular phone subsystem 12. In this mode, the audio switch 16 couples the vehicle embedded cellular phone subsystem 12 to the base station 20. The user may command the system controller 30 (e.g., through function keys on handset 23) to switch the audio switch 16 to use the handset 23. Alternatively, the handset 23 may rest in a cradle in the vehicle and when the handset 23 is removed from the cradle, the system controller 30 detects the removal and controls audio switch 16 to couple the handset 23 to the vehicle embedded cellular phone subsystem 12 through the base station 20. This allows the user to use the keys on the handset 23 to dial phone numbers, access voice mail and perform other functions that would typically be performed using voice recognition through the vehicle hands free audio processor 18 or normally operate the embedded cellular phone subsystem 12. Using the handset 23 instead of microphone 28 can improve the signal to noise ratio of communications by reducing external noise (e.g., road noise) for the user or passengers that may be distanced from the hands free microphone 28 and provide privacy for the calling party. In addition, the handset 23 has no cord, which is not common with handsets provided with vehicle embedded cellular phones, which allows unrestricted manipulation of the handset 23. The handset 23 can also provide voice mail control through the keypad using numeric keys and functional keys such as #, *, etc.

Figure 2:
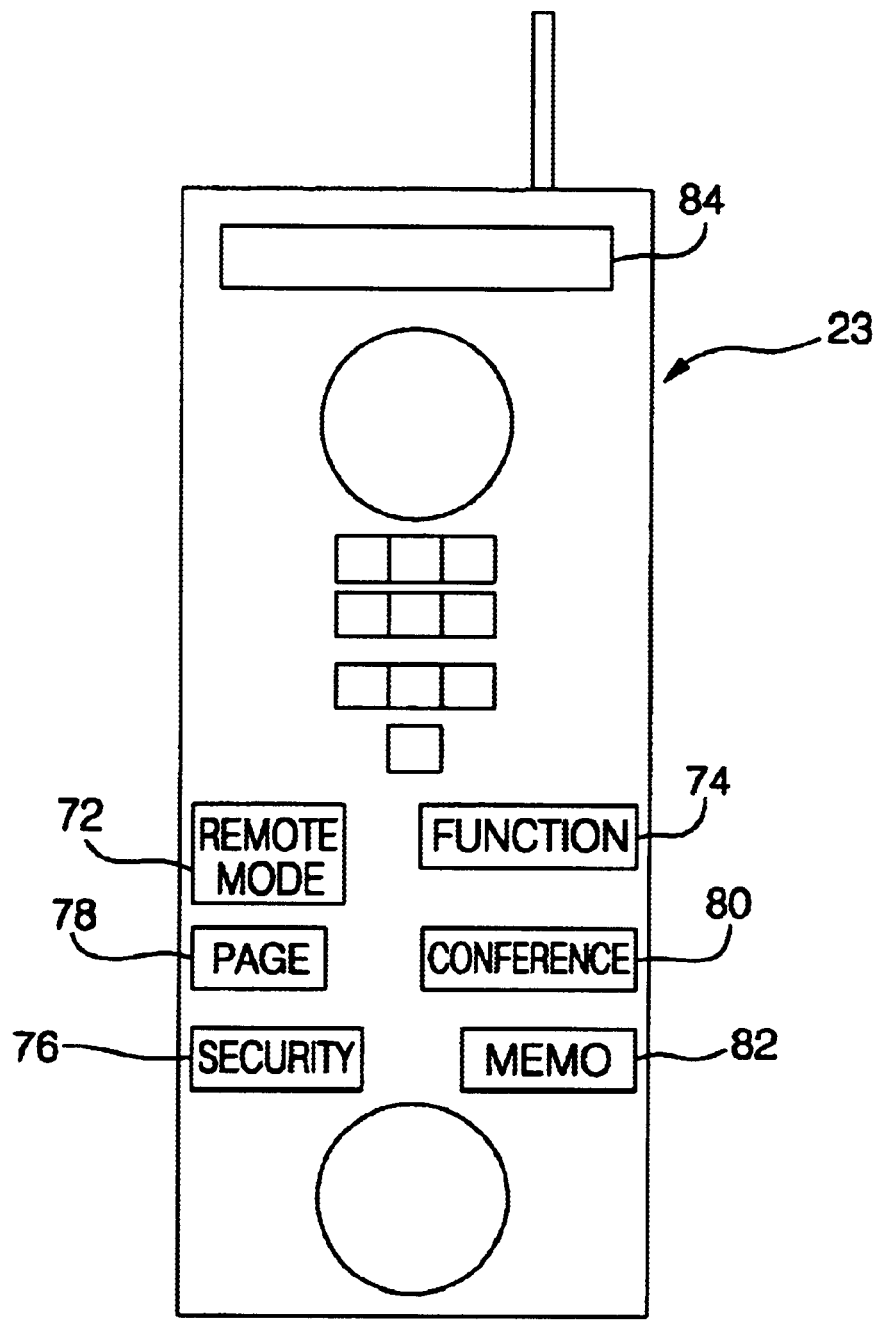
FIG. 2 is a diagram of a portable, wireless handset.

When the handset 23 is removed from the vehicle, a number of functions may be implemented. The handset 23 should be within the range (e.g., within 2 miles) of the base station 20 located in the vehicle. The handset 23 may be used to receive incoming calls and make outgoing calls through the vehicle embedded cellular phone subsystem 12. In this mode of operation, the audio switch 16 couples the base station 20 to the vehicle embedded cellular phone subsystem 12. This may be done manually by the user by manipulating a remote key 72 (FIG. 2) on the handset 23 or a similar control in the vehicle. Alternatively, the system controller 30 can detect removal of the handset 23 from the vehicle and the system controller 30 can actuate audio switch 16. The system controller 30 can detect removal of the handset by mounting the handset 23 in a cradle and detecting removal of the handset 23 from the cradle. Alternatively, the user may actuate the audio switch 16 through an activation button in the event no cradle exists.

Another feature used when the handset 23 is located away from the vehicle is the ability to page the handset 23. The wireless device subsystem in FIG. 1 includes a handset location feature which allows the user to press a button on the base station 20 in the vehicle and generate a tone at the handset 23. Alternatively, the handset can vibrate to notify the remote user of the paging. This feature is useful in situations where a user in the vehicle wants to coordinate a meeting with a user remote from the vehicle carrying the handset or wireless device. The user in the vehicle can page the remote user to signal that it is time to return to the vehicle or meet at a designated location.

As an alternative to paging the handset 23, the handset 23 and the vehicle hands free subsystem may be coupled to allow verbal communications between the user in the vehicle and the remote user. In this mode, the audio switch 16 is set to couple the vehicle hands free processor 18 to the base station 20. The user in the vehicle may set audio switch 16 in this mode by manipulating controls in the vehicle. Alternatively, the remote user may place audio switch 16 in this mode by sending a command to the system controller 30. The system controller 30 then sets the audio switch 16 to connect the vehicle hands free processor 18 to the base station 20. The handset 23 may include a function key 74 (FIG. 2) that allows the user to send a signal to the system controller 30 to couple the vehicle hands free processor 18 to the wireless base station 20.

A remote user may also control vehicle functions from the handset. As shown in FIG. 1, the system controller 30 is coupled to the vehicle which controls or activates a variety of vehicle functions. A remote user can send a signal to the system controller 30 via the handset 23 to control a number of vehicle functions. For example, the remote user can control features such as door locks, trunk release, mirror and seat settings, radio settings, vehicle alarm, windows, remote starting, heater, defroster, locate vehicle (sound horn/flash lights), etc. To control such vehicle functions the user can press a function key 74 (FIG. 2) on the handset 23 which conditions the system controller 30 to expect a vehicle control command. The remote user may then press vehicle function or enter a numerical code through the handset 23 which identifies a particular function or speak the requested function into the handset. If the user enters a numerical code (e.g., 12=lock doors) or depresses a predefined function key, then the system controller receives that code and sends the appropriate instruction to control the vehicle via path 60. If the user speaks a function name (e.g., "lock doors"), the hands free audio processor 18 converts the audio into the appropriate code and forwards the code to the system controller 30.

An additional function for the remote user is the inclusion of a security button 76 (FIG. 2) on the handset 23. The security button 76 would be used by the remote user in the event of a medical emergency, a criminal act, etc. Depressing the security button 76 may initiate several actions. The system controller 30, upon receipt of a security signal from the handset 23, may initiate a call through the vehicle embedded cellular phone subsystem 12 to a monitor to notify the monitor of the emergency. The monitor may be a private commercial entity (e.g., a monitoring company), a government entity (e.g., police or a combination of the entities working together. The monitor than can direct assistance to the user. The vehicle may include a global positioning system or other position locating system so that the monitor can determine the location of the vehicle. The monitor can call the handset 23 to more precisely locate the user and to determine the nature of the emergency. The system controller 30 may also initiate certain vehicle functions such as the vehicle alarm or flashing lights upon receipt of a security signal.

Additional features are available when more than one portable handset 23 is employed. The handset 23 may include a page button 78 which allows a remote user to page all other remote users. The function is initiated by any remote user depressing a page key on the handset 23. This transmits a signal to the base station 20 which instructs the base station 20 to perform a page operation. The base station 20 broadcasts the page signal to all the handsets 23 which causes each handset 23 to generate a tone. Alternatively, the handsets may vibrate to notify the user of the page. The handset 23 may be configured so that when the page button 78 is depressed, the handset is not paged to prevent the user from paging him or herself. This function may be useful when multiple remote users wish to coordinate a meeting.

Instead of each multiple user carrying a complete handset 23, multiple users may carry simple, inexpensive pagers. The pagers may be activated from the base station 20 in the vehicle. Alternatively, depressing the page key 78 on the handset 23 instructs the base station 20 to send a page signal. This provides multi-user paging system with reduced expense since the pagers are less complex than handset 23.

Another option available for multiple remote users each carrying a handset is a conference option. When the user depresses the conference button 80, the system controller 30 receives a command to configure the base station 20 in a conference or "walkie-talkie" mode. In this mode, communications received from one handset is broadcast to other handsets. If multiple remote users each press the conference button 80, then they will be linked in a conference call through the base station 20. This feature is useful if multiple remote users wish to communicate to each other. The multiple remote user paging feature may be used as a signal, to the remote users within range of the vehicle, to depress the conference button 80.

The portable handset may receive a variety of types of communications including voice, facsimile and data. Accordingly, the handset may include a port for data/fax communications so that the user can receive and send faxes from the handset and can upload or download data from the handset 23. The handset 23 may include a display 84 (e.g., LED) to allow for reading of e-mail or other text messages or information via the Internet.

The embedded cellular phone subsystem 12 may also include a memo feature which allows the user to record and play personal memos. Handset 23 may be used to both record and playback memos through a memo key 82. Depressing the memo key 82 sends a signal to system controller 30 to couple the handset 23 to the memo portion of the embedded cellular phone subsystem 12. The user can then use keys on the handset 23 to play/record memos.

The communications system 10 may also be used to communicate with a second base station located remotely from the vehicle. The other base station may be located in a building such as a residence or business. In this embodiment, the base station 20 may communicate with the second base station to transmit commands to the second base station. The base station 20 can transmit commands to the second base station to control functions relating to a building where the second base station is located. For example, if a second base station is located in a residence, the base station 20 can transmit commands to arm a home security system, turn on lights, unlock doors, turn on heating/cooling systems, etc. In addition, the handset 23 can also be used to transmit commands to the second base station to initiate predetermined functions.

To conserve power, the communications system 10 may enter a sleep mode upon a predetermined period of inactivity. In the sleep mode, minimal power is consumed. The system controller 30 can performed minimal functions such as monitoring receipt of a signal at the vehicle embedded cellular phone subsystem 12 indicating an incoming call. The system controller 30 may also monitor receipt of a signal at the base station 20 from any wireless device (handset or pager). Upon detecting a signal received at either the vehicle embedded cellular phone subsystem 12 or the base station 20, the system controller 30 can "wake-up" the communications system 10 by sending a command to the wireless device subsystem, vehicle hands free subsystem and the vehicle embedded cell phone subsystem 12.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A communications system comprising:
   a vehicle embedded cellular phone subsystem for receiving and sending communications;
   a wireless device subsystem including a base station and a wireless handset, said base station being coupled to said vehicle embedded cellular phone subsystem for receiving incoming communications from said vehicle embedded cellular phone subsystem and transmitting said incoming communications to said handset and receiving outgoing communications from said handset and sending said outgoing communications to said vehicle embedded cellular phone subsystem;
   a vehicle hands free subsystem including a microphone for receiving audible communications from a user and a speaker for providing audible communications to the user;
   said vehicle hands free subsystem being coupled to said vehicle embedded cellular phone subsystem; and
   a switch for selectively connecting said vehicle embedded cellular phone subsystem to said vehicle hands free subsystem.

2. The communications system of claim 1 further comprising:
   a controller for controlling the status of said switch.

3. The communications system of claim 1 further comprising:
   a further wireless handset in communication with said base station;
   said wireless handset generating a conference signal;
   said base station receiving said conference signal and placing said wireless handset and said further wireless handset in communication in response to said conference signal.

4. A communications system comprising:
   a vehicle embedded cellular phone subsystem for receiving and sending communications;
   a wireless device subsystem including a base station and a wireless handset, said base station being coupled to said vehicle embedded cellular phone subsystem for receiving incoming communications from said vehicle embedded cellular phone subsystem and transmitting said incoming communications to said handset and receiving outgoing communications from said handset and sending said outgoing communications to said vehicle embedded cellular phone subsystem;
   a switch for selectively connecting said vehicle embedded cellular phone subsystem to said wireless device subsystem; and
   a controller for controller the status of said switch.

5. The communications system of claim 4 wherein:
   said controller receives a signal from said handset to set said switch to connect said wireless device subsystem and said vehicle embedded cellular phone subsystem.

6. A communications system comprising:
   a vehicle embedded cellular phone subsystem for receiving and sending communications;
   a wireless device subsystem including a base station and a wireless handset, said base station being coupled to said vehicle embedded cellular phone subsystem for receiving incoming communications from said vehicle embedded cellular phone subsystem and transmitting said incoming communications to said handset and receiving outgoing communications from said handset and sending said outgoing communications to said vehicle embedded cellular phone subsystem; and
   a wireless unit in communication with said base station, said wireless unit comprising at least one of a further wireless handset and a pager;
   said wireless handset generating a page signal;
   said base station receiving said page signal and paging said wireless unit in response to said page signal.

7. The communications system of claim 6 wherein:
   said paging of said wireless unit causes said wireless unit to generate an audible tone.

* * * * *